Dec. 4, 1923.
W. A. P. BERG
1,476,235
METHOD OF GENERATING MIXED GAS IN TWIN GENERATORS
Filed April 9, 1923
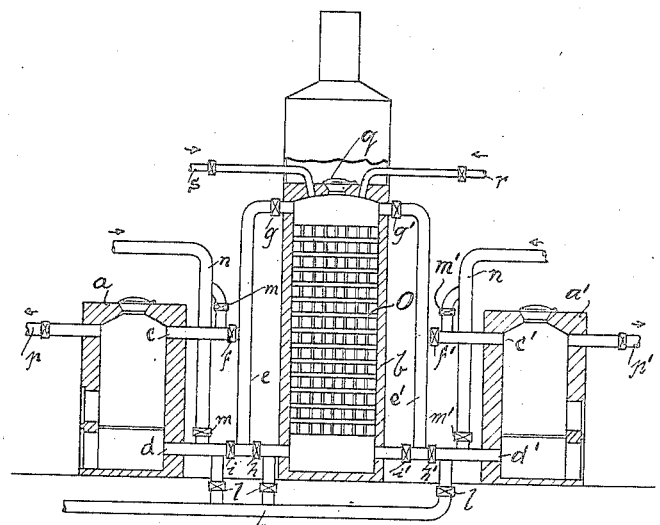
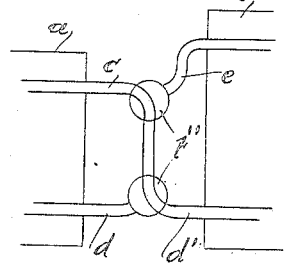
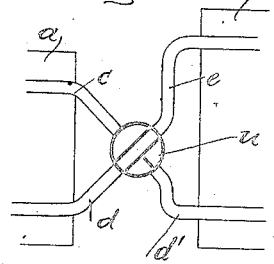
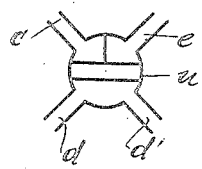

Patented Dec. 4, 1923.

1,476,235

UNITED STATES PATENT OFFICE.

WERNER ALFRED PAUL BERG, OF KOBE, JAPAN.

METHOD OF GENERATING MIXED GAS IN TWIN GENERATORS.

Application filed April 9, 1923. Serial No. 630,962.

*To all whom it may concern:*

Be it known that I, WERNER ALFRED PAUL BERG, citizen of Germany, residing at Kobe, in Japan, have invented certain new and useful Improvements in Methods of Generating Mixed Gas in Twin Generators, filed in Germany April 7, 1921, and of which the following is a specification.

For the complete gasification of bituminous combustible material there are used either generators in which simultaneously a dry distillation and a gasification are carried out or two generators in series, the one for dry distillation and the other for gasification. With single generators the gasification takes place in the lower part of the generator and the dry distillation is effected in the upper part of the same. With two generators they work alternately and successively so that the gases from gasification produced in the first generator are conducted through the second generator to traverse in the same freshly charged combustible material which is thus submitted to dry distillation. The coal admitted in small quantities drops therefore upon already distilled material. In the generators of known construction the gases which come from the first generator traverse first the fresh coal and then the coke under the coal, that is to say, they flow from above to below through the generator.

In all such apparatus the gas produced is reheated in order to fix the same or to produce a constant gas. This manufacturing principle is followed also if at the working with two generators the dry distillation and the gasification is effected in the first generator the second one being used only for fixing.

The mixed gas produced in these generators can either consist of generator gas and coal gas or of water gas. The latter gas is the more valuable one and is generally of greater consideration than the first one.

This manufacturing method has for its object the complete transfer of the coal into the gaseous state with production of valuable by-products. The new process possesses further considerable advantages which are of great importance for the coal industry. The waste heat from hot blasting is utilized whereby a greater economy is insured. The production of the valuable water gas is more economical, a further advantage being the manifold applicability of the apparatus.

The invention consists in that the gas produced in the generator is superheated by utilization of the waste heat from the hot blasting before the same is admitted to the other generator.

Further objects of the invention are the special construction of the apparatus and the manifold applicability of the method by means of which the gas produced can be influenced in different manners as likewise the by-products, and the applicability and economy of the apparatus.

Methods have become known according to which reduction chambers have been inserted behind the generator but in this case other gases than those stated above have been produced and other working methods are used. The method according to the present invention has for its object to improve the quality of the gas from the first gasifying period or from the water gas period by renewed admission of heat and by conducting the gas through a layer of coke before the period of dry distillation begins.

The method has further become known of conducting the gas from the first generator downwardly through the second generator. This method is, however in opposition to the method according to the present invention whereby other effects are produced.

A form of construction of the improved apparatus is shown on the accompanying drawing by way of example, wherein Fig. 1 is a vertical sectional view of the plant, Figure 2 is a diagrammatic elevation.

Figure 3 is a view similar to Figure 2.

Figure 4 is a diagrammatic vertical sectional view.

Between the two generators $a$, $a'$, a superheater $b$ is inserted. This superheater is connected with the generator by means of a combined pipe system in such a manner that the transition from one generator into the superheater or inversely permits to give any direction to the gases which flow through the apparatus.

With this object in view the pipes $c$ and $d$ are connected with the generators $a$, $a'$, and with the superheater $b$. The two pipes $c$, $d$, are connected by a pipe $e$. The pipes for the generator $a'$ are designated by $c'$, $d'$, and $e'$. All the pipe conduits and other devices which are designated with the index Figure 1 on the drawing and which will be so designated in the following description belong to the generator $a'$.

In the pipe $c$ a closing valve $f$ and in the pipe $e$ a closing valve $g$ is arranged, two closing valves $h$, $i$, being arranged in the pipe $d$ of which the one serves for shutting off towards the generator $a$ and the other for shutting off towards the superheater $b$. The air pipe $k$ is connected with the pipes $d$, $d'$. In the upwardly turned branches of the air pipe $k$ closing valves $l$ are arranged, said branches terminating in front and behind of the closing valves $h$, $i$, and $h'$, $i'$ of said pipes $d$, $d'$. The steam pipes $n$ traverse the pipes $c$, $d$, and $c'$, $d'$, in the well known manner, closing valves $m$, $m'$, being inserted in said steam pipes leading to the pipes $c$, $d$, and $c'$, $d'$, respectively. Valve $u$ is a multi-way cock or valve to permit the pipes to be connected in the desired manner according to requirements. In Fig. 2 valves $f''$ replace valves $f$, $g$, $i$, and $h$ of Fig. 1.

The superheater consists preferably of an apparatus having a lining of fire brick and containing a checker work $o$ made from fire brick or plates. Other material which easily absorbs heat and which is adapted to easily give up the heat again could be used and arranged in such a manner that the gas can flow through the open spaces of the checker.

The generators have gas outlet pipes $p$, $p'$, respectively.

In the plant which has been just described the waste heat is utilized which always contains besides the sensible heat a more or less quantity of latent heat. To the superheater combusting air is supplied when the heating is being started. The operation of the plant is as follows:—

During the hot blowing period air is blown in at the lower end of the generator. This air penetrates into the layer of coke and effects the combustion of the coke and thus the heating of the generator. The gases from combustion flowing out at the upper end of the generator are conducted into the lower part of the superheated, air being added in order to complete the combustion of the combustible constituents of said gases. The gases transmit their heat to the superheater and flow out of the same at the upper end through the stack valve $q$. At the starting of the heating the second generator is charged with fresh fuel which drops upon the lawer of coke contained in this generator. The quantity of the freshly supplied coal corresponds to the coke which is consumed for the production of the water gas.

During the gasifying period which now follows steam is admitted into the first generator and decomposed by the incandescent coke causing formation of water gas. The water gas produced flows into the superheater at the upper end of the same and traverses the superheater downwardly and flows over into the second generator to traverse the same upwardly so that the water gas traverses the incandescent layer of coke before it reaches the material for distillation. The water gas coming from the first generator contains, particularly toward the end of the distillation period, decomposed steam, in consequence of the amount of heat which has been consumed for the production of the gas, and of the reduction of the temperature in the generator. The formation of carbonic acid in the water gas is thus favored. The superheater which has been heated to a high temperature by the combustion of the waste or blast gases transmits heat to the water gas which flows in countercurrent to the heating waste gas so that this water gas is superheated before it enters the second generator, being thus capable of transmitting heat to this second generator. A further decomposition of the steam which has not yet decomposed is thus insured and also a decomposition of the carbonic acid into carbon monoxide. The heat from waste or blast gases is thus utilized for improving the gas produced and for completing the decomposition of the steam.

In the distillation of the coal in the second generator which follows the production of the water gas, the hot water gas traverses the coal and transmits to the same the heat which is required for the distillation, it admixes the coal gas and flows out together with the same by the shortest way. The quantity of heat which is used for the distillation of the coal according to this method is in such relation to the heat necessary for the purpose that the distillation is effected at a temperature which is still sufficient for the distillation but not sufficient to decompose the tar vapors produced in the distillation. Owing to the fact that the gases from distillation escape directly without coming in contact with hot surfaces insures the formation of a low temperature which is of especially high value. According to the methods used hitherto if the water gas traverses the apparatus in the other direction the distillation of the coal takes place first and the mixed gas traverses afterwards only the layer of coke. The heat of the water gas is used for the distillation so far that in the layer of coke of the second generator no further decomposition takes place worth mentioning of the excess steam and of the carbonic acid takes place. Moreover the coal gas and the tar traverse the coke in a finely distributed state and come consequently in intimate contact with hot surfaces so that the low temperature tar or primary tar is decomposed.

According to the present method no distillation by excess steam takes place as is the case in the other methods.

Since in the second generator only a limited production of water gas takes place and consequently a moderate amount of heat is required, the required heat admitted to the coal for distillation is obtained by means of the preliminary superheating.

If the quantity of the combustible material makes it necessary, the heat admitted can be further increased by addition of air in the second generator either simultaneously with the heating of the first generator and before the charging of the fresh combustible material or during the distillation with a moderate addition of air. In the latter case the air is preferably admitted into the generator in close proximity to the distillation zone. This superheater inserted between the generators can serve, besides for the purpose described, as a carburetor for the production of oil gas and consequently of oil-carbureted water gas. In this case the superheater works exactly like an ordinary carburetor.

With this object in view an oil supply pipe $r$ is provided according to this invention in the upper part of the superheater. By this oil pipe $r$ oil is injected into the upper part of the superheater $b$ if the same is to be used for the production of oil gas; this oil being decomposed by the contact with the hot bricks so that oil gas is produced. The oil gas admixed with the water gas traverses the superheater and flows over into the second generator which serves now as a fixer for the carbureted gas which flows through the incandescent coke. In this method the water gas from the first generator can be conducted downwardly through the carburetor or in the same direction as the oil gas which has been produced. At the hot blasting of the first generator the heated gases can be further conducted, after they have traversed the superheater, through the second generator. This second generator can however be heated alone as has been described. By this method a complete gasification can be carried through if coal is charged into the second generator and submitted to dry distillation by the oil-carbureted water gas in the above described manner. A gas can be thus produced which possesses the calorific value of coal gas and even a higher calorific value of approximately 600 or 700 B. t. u. per cubic foot, the mixed gas produced exclusively from the coal and coke having only approximately 350 heat units.

The apparatus shown in the drawing which serves for carrying out the method described permits further the production of simple blue water gas with the aid of one or of both generators if instead of bituminous coal, coke or anthracite is charged into the apparatus. The superheater can be heated by the waste or blast gases and it can serve for superheating steam which is produced in separate steam generators. It could further be used for the direct production of steam by injection of water with which object in view a water supply $s$ arranged above the superheater is used for injecting preferably previously heated water. The preliminary heating of this water could be effected with the aid of a separate heater which is heated by the waste of blast gases from the generator.

What I claim as new is:

A method of producing mixed gas which consists in generating gas in one generator, passing said gas downwardly through a superheater to the lower incandescent zone of a second generator, and thence through the upper distilling zone of the said second generator, air being admitted directly to the said incandescent zone during the upward passage of said gas.

In testimony whereof I hereunto affix my signature.

WERNER ALFRED PAUL BERG.

Witnesses:
G. OGATA,
TCHIRO LUDZUKI.